(12) United States Patent
Gonzalez

(10) Patent No.: US 6,841,071 B2
(45) Date of Patent: Jan. 11, 2005

(54) SYMBIOTIC RESIDUAL WATER TREATMENT STATION

(76) Inventor: Luis Javier Fabregas Gonzalez, C/Alfonso X, n°3, 4° Izq., E-30008 Murcia (ES)

( * ) Notice: Subject to any disclaimer, the term of this patent is extended or adjusted under 35 U.S.C. 154(b) by 0 days.

(21) Appl. No.: 10/197,410

(22) Filed: Jul. 18, 2002

(65) Prior Publication Data

US 2002/0175116 A1 Nov. 28, 2002

Related U.S. Application Data

(63) Continuation of application No. PCT/ES00/00942, filed on Dec. 27, 2000.

(30) Foreign Application Priority Data

Jan. 19, 2000 (ES) .......................................... 200000186

(51) Int. Cl.[7] .................................................. C02F 3/32
(52) U.S. Cl. ....................... 210/602; 210/617; 210/747; 210/150; 210/170
(58) Field of Search ................................ 210/150, 151, 210/170, 602, 747, 617

(56) References Cited

U.S. PATENT DOCUMENTS

| 4,218,318 | A | * | 8/1980 | Niimi et al. ................. 210/150 |
| 4,415,450 | A | * | 11/1983 | Wolverton ................... 210/151 |
| 4,839,051 | A | * | 6/1989 | Higa .......................... 210/170 |
| 4,995,969 | A | * | 2/1991 | LaVigne ..................... 210/150 |
| 5,156,741 | A | * | 10/1992 | Morrison et al. ........... 210/170 |
| 5,194,147 | A | * | 3/1993 | Augustine et al. .......... 210/151 |
| 5,549,817 | A | * | 8/1996 | Horsley et al. ............. 210/170 |
| 5,893,975 | A | * | 4/1999 | Eifert ......................... 210/150 |

FOREIGN PATENT DOCUMENTS

| EP | 586805 | * | 3/1994 |
| WO | WO 96/25366 | * | 8/1996 |

* cited by examiner

Primary Examiner—Christopher Upton
(74) Attorney, Agent, or Firm—Penrose Lucas Albright

(57) ABSTRACT

A treatment and irrigation system for relatively large tracts of land used for sports, public gardens, recreation, agricultural crops, or other land uses, wherein the output from a primary or secondary sewage treatment plant is received by a drip, or trickle, irrigation system which is disposed over a relatively large area to be irrigated, immediately under a stratum for receiving the roots of flora to be irrigated and above a layer of very permeable matter which receives the output of the sewage treatment plant. Such output, which is received, in part, through capillary action by flora growing on the upper stratum, drips through the permeable matter layer wherein the output is subjected to an aerobic action due to air in that layer. The permeable layer rests on underlying non-permeable base although this also may also be permeable ground. After the output is aerobically treated in the very permeable matter it may be received by ponds or other bodies and is eventually transported by underground water flow between the permeable layer and the base or ground to exit into a river, stream or other water in which it is diffused.

11 Claims, 1 Drawing Sheet

SYMBIOTIC RESIDUAL WATER TREATMENT STATION

RELATED APPLICATION

This Application is a Continuation of International Application No. PCT/ES00/00492, filed Dec. 27, 2000.

FIELD OF THE INVENTION

The present invention relates to sewage water treatment systems which are used for irrigation of green tracts of flora.

BACKGROUND OF THE INVENTION

This invention is an improvement of present developed techniques for tertiary treatment of sewage waters by means of infiltration—percolation in permeable layers, as well as for cultivation of agricultural, sports and leisure areas by means of underground drip-feeders.

State of the art water treatment systems comprise devices for the surface supply of liquid to the layers (essentially flow and sprinkling) without complementary use of the layer surface to provide green tracts of flora. In contrast to the state of the art relative to the irrigation of green tracts by means of underground drip-feeders, the present invention incorporates the complementary use of the same as a treatment for sewage waters, thus recovering the major part of the water used.

The technique used in so called "green filters" is characterized by the use of superficial supply devices and the use of the same ground as a natural depuration system, without directly recovering the treated water and using the irrigated surface as a green area for profitable purposes.

In a prior art document, Spanish Patent No. 2,050,909, a procedure for treatment of sewage waters and polluted gases emanating from a hothouse is shown, for which it is necessary to cover the surface of what is termed an "earth layer reactor" by means of a structure of transparent roof and walls, so that toxic gasses rising from the bottom of the reactor can be recovered by this structure. In contrast, in the instant invention flora established over the layer surface of the treated area do not need to be covered inasmuch as they are grown in an entirely healthy environment (without gases, aerosols, odor or mud) and therefore are fully compatible with human activities whether for agricultural purposes or for sports, leisure or environmental activities which are totally unviable according to Spanish Patent No. 2,050,909.

Therefore, the "Photosynthetic harvest" described in Spanish Patent 2,050,909 fails to disclose a productive character and its field of plants serves only to improve the aesthetic and treatment of sewage waters; being useful only a very small varieties of vegetable species, which is contrary to the present invention wherein an extensive list of flora can be established that have an essentially economical role, increasing considerably the value of the depurated surface.

Finally in Spanish Patent No. 2,050,909, cultivation occurs directly over the same infiltration layer, whereas with the present invention, the flora is provided over a special substratum, independent of the same treatment system or infiltration layer and moisture rises by capillarity action from the drip-feeder net that supplies the referred layer.

Considering International Publication WO 9625366, this document describes an apparatus or device featured by two chambers. One is central and filled with a porous material, with different profiles and grain sizes, making a current of sewage water ascending from the base until its surface passes through the chamber, completely flooding such chamber that functions as a biological reactor. Water flowing through this first chamber falls, due to gravity into a second chamber surrounding the first chamber that is provided with several containers or lateral pots in which it is possible to cultivate plants. The fundamental differences of such prior art disclosures in respect of the present invention, are that, in the first one the treatment is made by means of a double chamber apparatus and not over the same surface. Sewage water is applied to the inside of the first chamber by means of an underwater flood system and anaerobic conditions dominate (absence of air in the deputation) which conditions the treatment in a different manner from the one in the present invention. Another main difference is to be noted in relation with the flora produced, as in International Publication WO 9625366 the flora occurs over the walls of an apparatus to contribute to the deputation and also the beautifying of said apparatus but not over the ground. This limits the type of flora, as well as the activities and the profitability of the system in a manner which are significantly different to those of the present invention.

Finally attention is invited to European Patent 0586805 in which a watertight compartment full of filtrating sand to which sewage water is supplied in a similar way as that described above, whereby a flood and layer saturation is provided that provides water to plants over the surface. The sewage water is supplied to the plant layer by means which are different from the underground drip-feeder used in the present invention. Furthermore, the sandy layer flood causes internal flows and anaerobic conditions that result in a depuration which is completely different to the one which takes place on the present invention. Further, in European Patent 0586805 only water plants can be cultivated, creating an unhealthy area which is unsuitable for the activities and productive processes possible over the cultivation areas of the invention. In view of the above prior art, it is concluded that flora cultivation has an accessory character that focuses primarily on minimizing the environmental impacts of the flooded areas as well as for contributing to some sewage waters treatment process, but being incompatible with the type of green areas of cultivation developed according to the present invention.

BRIEF SUMMARY OF THE INVENTION

In contrast to the prior art, the present invention harmonizes two opposed activities, one consisting in quality resources generation (treatment plant) and other related with water consumption (the cultivation of green profitable areas). The invention therefore provides advantages which, without limitation, are as follows:

The underwater irrigation device of the invention (drip-feeder) substantially improves hydraulic efficiency of the treatment system (without water loss because of evaporation) despite its symbiosis utility in a green area.

Improvement of the deputation parameters, due to the horizontal distribution and dosage of the sewage water which is more suited to the essential requirements of depuration systems which utilize infiltration-percolation.

The symbiotic treatment method does not cause floods of non-treated waters, nor aerosols or odors and accordingly avoids unpleasant effects which are produced by other water treatment systems.

Fostering the cultivation of flora coverage of areas for the purposes of sport, agricultural, leisure or aesthetic appeal where not now possible, due to the inadequacy of water resources. Also the invention provides the potential of economical sewage water treatments that, until the present invention were considered to be unfavorable from the environmental standpoint.

BRIEF DESCRIPTION OF THE DRAWINGS

Other objects, adaptabilities and capabilities will appear as the description progresses, reference being had to the accompanying drawings, in which.

DETAILED DESCRIPTION OF THE PREFERRED EMBODIMENTS OF THE INVENTION

Figure 1:
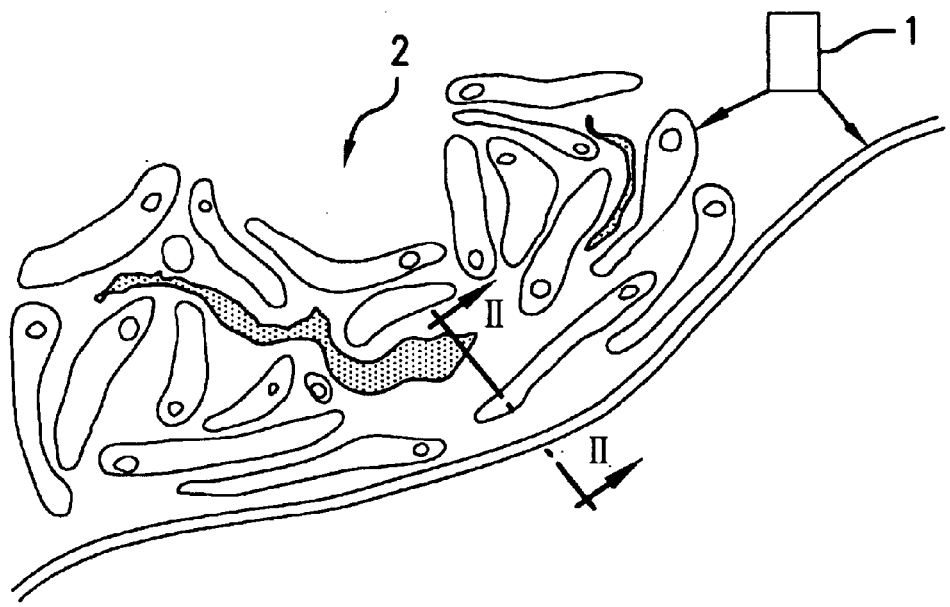
FIG. 1 is a plan view of an area wherein, in accordance with the present invention, sewage waters from a primary or secondary treatment plant are treated by a symbiotic sewage water treatment method which, in the present case, is used for a golf course.

A description of preferred embodiments of the present invention, according to the designs disclosed herein and in which, on the same physical area, are combined simultaneously, include sewage water treatment with the generation of green usable areas, such as for example golf courses, or areas for other sports, gardens, leisure green areas, childrens' parks, agricultural cultivations, etc.

A symbiosis occurs between two antagonistic activities such as deputation and cultivation, in a symbiotic sewage water treatment range 2, wherein water, originated from a primary or secondary treatment facility 1, is depurated by infiltrating through a layer formed by sands, gravels or any other type of very permeable detritus materials, using underground drip feeders 4 placed over the referred layer surface.

Sewage waters from the underground drip-feeders percolate with a capillary, descendent flow through permeable materials, until reaching the impermeable base 5. This is performed by means of any of the existing procedure known in the current state of the art. As an alternative, layer 3 is not isolated from the ground, therefore allowing treated water to filtrate with low overcharge rates due to the broad area occupied by the layer in relation with the infiltrated volume.

Layer 3 continually remains unsaturated with water, that is to say, there is a presence of air so that sewage waters can be treated in aerobic conditions. To facilitate this result, very permeable materials are used in layer construction, causing an underground water flow 6 and its free exits 7 and 8 towards lower sites in the layer, thus avoiding water from accumulating and saturating intergranular spaces.

Above the percolation layer and the aforesaid underground drip-feeders, a sandy or similar substratum which is particularly intended to promote the germination and growth of cultivation is provided, to obtain an economical profit from large areas that require treatment systems of the filtration-percolation type and which, until the present invention, were unable so to function basically due to use of superficial irrigation devices, more particularly sprinkling and flooding that negated agricultural, sports, leisure or commercial use of the ground.

In other words, it is not possible successfully to irrigate a surface with sewage discharge by means of surface irrigation devices or systems, if it is intended to obtain, at the same time, use of the area for human activities as mentioned above that conforms with the necessary requirements of human health.

Figure 2:
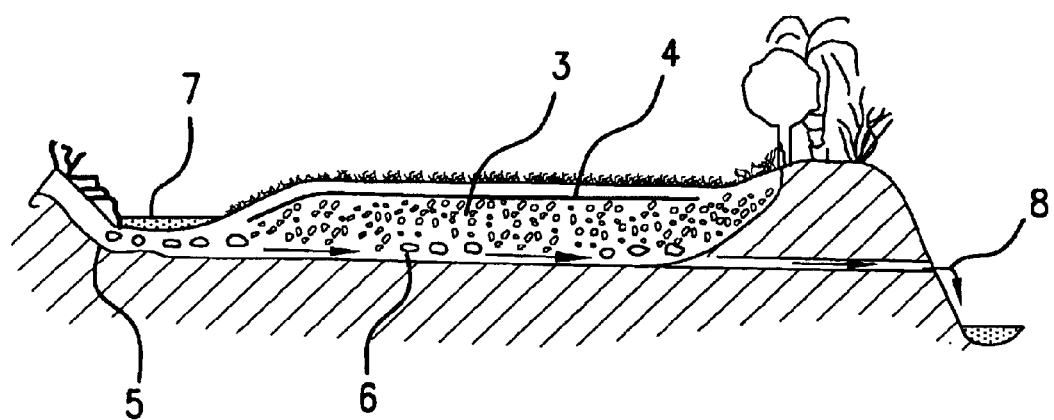
FIG. 2 is a cross-sectional view taken on section line II—II of FIG. 1.

The root substratum as shown in FIG. 2, as disposed above the drip or trickle irrigation devices 4, absorbs moisture from the underlying layer by capillary action and therefore the use of other specific means for complementary irrigation of the green areas is unnecessary.

With the treatment, it is possible to provide ground areas and lakes 7 on which it is possible to cultivate and provide every kind of flora and water fauna, otherwise compatible with the climate, that, in combination with ultraviolet radiations from the sun, add to the sewage waters' depuration, and thus increase the economical and environmental value of the symbiotic sewage water treatment disclosed herein.

Although I have disclosed the preferred embodiments of my invention, it is to be understood that it is capable of other adaptations and modifications within the scope of the following claims.

What is claimed is:

1. A system for the treatment of output fluid from a primary or secondary sewage treatment plant comprising a tract of land having a drip feeder irrigation system which underlies a stratum of said tract of land that receives roots of flora growing in said tract of land, a layer of very permeable matter immediately underlying said drip feeder irrigation system, said very permeable matter receiving and aerobically treating said output fluid as it flows therethrough by gravity, said very permeable matter being supported by an underlying ground and wherein a fluid flow passage is provided between said very permeable matter and said ground for discharging and diffusing fluid treated by said very permeable matter to a body of water.

2. The system in accordance with claim 1, wherein an impermeable base layer is provided between said very permeable matter and said ground, said fluid flow passage being provided above said base layer.

3. The system in accordance with claim 1, wherein said permeable matter comprises a sandy material.

4. The system in accordance with claim 1, wherein said tract of land comprises a sports field.

5. The system in accordance with claim 4, wherein said sports field comprises a golf course.

6. The system in accordance with claim 1, wherein said flora is an agricultural flora.

7. The system in accordance with claim 1, wherein said tract of land comprises a park.

8. The system in accordance with claim 1, wherein said flora comprises gardens.

9. The system in accordance with claim 1, wherein said stratum comprises a substance which promotes the germination and growth of said flora.

10. A method of treating the output from a primary or secondary sewage treatment plant which comprises delivering such output to a drip irrigation system previously installed in an area of land for irrigation and sewage treatment purposes underlying a root system of a flora that is disposed on said area of land, said output being received in and irrigating the root system of said flora by dripping said output through an underlying layer of highly permeable material supported by a ground, aerobically treating said output as it drips through said layer in a purification treatment of said output and providing for the flow of said output after being so treated to be received and diffused in a body of water.

11. A method of irrigating flora on a tract of land and further treating the output from a primary or secondary sewage treatment plant which comprises providing a stratum of a substance for receiving the roots of said flora immediately over a drip irrigation system disposed on said tract of land, flowing said output through said drip irrigation system so that the roots of said flora receive a sufficient amount of said output to promote growth of said flora on said tract of land and so that the remainder of said output drips through a sufficient quantity of an underlying highly permeable material supported by a ground to be substantially purified by being aerobically treated by its flow through said highly permeable material, and discharging said purified output to a body of water.

* * * * *